United States Patent Office 3,634,524
Patented Jan. 11, 1972

3,634,524
PROCESS FOR PRODUCING OLEFINIC HYDRO-
CARBONS FROM ALKYL HALIDES
Tatsuo Horie, Tokyo, Yasuo Fujiwara, Kanagawa-ken, and Tetsuya Takezono, Tokyo, Japan, assignors to Nippon Oil Company, Limited, Tokyo, Japan
No Drawing. Filed Jan. 29, 1968, Ser. No. 701,099
Claims priority, application Japan, Feb. 9, 1967, 42/7,971
Int. Cl. C07c 11/02, 31/02
U.S. Cl. 260—677 XA
4 Claims

ABSTRACT OF THE DISCLOSURE

A process for producing an olefinic hydrocarbon from an alkyl halide using a catalyst consisting of an aqueous hydrogen chloride solution of antimony trichloride or zinc chloride.

---

This invention relates to the process for decomposing alkyl halides to produce alcohols and/or olefinic hydrocarbons. Further, the present invention relates to the process which comprises decomposing alkyl halides with the catalyst consisting of the aqueous hydrogen chloride solution of antimony trichloride and/or zinc chloride to produce alcohols, olefinic hydrocarbons or mixture of them in high yield.

As the processes for decomposing alkyl halides to produce alcohols or olefinic hydrocarbons having the same number of carbon atoms as that of used alkyl halides, a thermal decomposition process and a solvolysis process are known up to now. In the process of thermal decomposition of alkyl halides, the reaction proceeds mainly on the wall surface of reaction vessel in the state of heterogeneous reaction, and carbon-like deposit forms considerably on the wall surface, therefore, thermal conductivity through the wall is lowered, while as the velocity of homogeneous reaction occurring in the position away from the wall surface is slow, so that the velocity of the decomposition reaction shows a tendency of slowing down gradually in the course of the reaction.

Numbers of studies of solvolysis reaction have been carried out since 1930. For example, according to the reports of E. D. Hughes, C. K. Ingold, et al., these reactions proceed according to the mechanisms of homogeneous first-order reaction (SNL type) or homogeneous second-order reaction (SN2 type). [J. Chem. Soc., 236 (1935); J. Chem. Soc., 960 (1940); J. Chem. Soc., 1206, 1220, 1230, 1238, 1256, 1265 and 1279 (1957)].

For these reactions of solvolysis, water, aqueous alkaline solutions, organic acids and alcohols are employed as solvents, however the low reaction velocity has been the defect of the reaction.

This invention provides an improved process in which alkyl halides are decomposed by using a novel catalyst to produce corresponding alcohols or olefinic hydrocarbons having the same number of carbon atoms in high yield in addition to high reaction velocity and good selectivity.

The catalyst employed in the process of the present invention comprises an aqueous hydrochloric acid solution of antimony trichloride, zinc chloride or both of them. Further, such aqueous catalyst solution contains from 2 to 6 mol./l. of the above-mentioned metal chloride and from 2 to 6 mol./l. of hydrogen chloride.

The catalyst solution of the present invention can be prepared by dissolving solid state antimony trichloride or zinc chloride into aqueous hydrochloric acid solution of proper concentration. The catalyst solution also may be prepared by adding aqueous hydrochloric acid solution into an aqueous suspension of antimony trichloride or zinc chloride.

The alkyl halides being employed in the process of the present invention have preferably from 2 to 18 carbon atoms, and the positions of halogen substitutions in the alkyl halides may be on primary carbon atoms, secondary carbon atoms or tertiary carbon atoms. Any halogens such as fluorine, chlorine, bromine and iodine can be employed, however, the reaction velocity is different with each other to some degree. Wherein, the decomposition velocity is higher in the order of fluorides, chlorides, bromides and iodides. Further the reaction velocity has the tendency of becoming higher in the order of primary carbon atoms, secondary carbon atoms and tertiary carbon atoms in view of the position of halogen substitution.

Only single component of the catalyst of the present invention does not show catalytic activity. In other words, the aqueous solutions of antimony trichloride and that of zinc chloride have no catalytic activity by themselves, and aqueous hydrochloric acid solution alone does not show any catalytic activity by itself. However, when antimony trichloride or zinc chloride, and hydrochloric acid are used together, a particular catalytic activity appears, and this fact is just the characteristics of the present invention and this fact has not been known in the past.

Though the precise mechanisms of the catalytic action of the present invention have not been made clear, it is considered that the complexes such as $(HSbCl_3)^+Cl^-$ or $(HZnCl_2)^+Cl^-$ may be active species of the present reaction, which are formed by antimony trichloride or zinc chloride, and hydrochloric acid in the aqueous solution.

The characteristics of the decomposition of alkyl halides by means of such utterly novel catalyst system are the fact that alkyl halides are decomposed in good yield and high reaction velocity by hitherto unknown catalysis of these active species in the aqueous solution.

The means of reaction of the present invention is to contact alkyl halides with the catalyst solution in liquid phase, and the reaction may be both continuous and batch-wide. The reaction temperature is generally low such as in the range of 50° C. and 150° C., though the suitable reaction temperature depends upon the kind of alkyl halide used. And in this range, olefinic hydrocarbons or alcohols are produced without any side reaction such as polymerization or condensation. If the operating temperature is below 50° C., the reaction velocity decreases, and if the operating temperature is above 150° C., desirable liquid phase reaction does not occur.

In this reaction it can be thought that carbonium ion is formed catalytically first, and then addition reaction of $OH^-$ to this intermediate carbonium ion occurs to produce alcohol in case the temperature is in lower range. And in case that the temperature is in higher range, it can also be thought that elimination reaction of $H^+$ from this intermediate carbonium ion occurs to produce olefinic hydrocarbon. So, alcohol or olefinic hydrocarbon can be principally produced when the operating temperature is chosen properly in the above-mentioned range from 50° C. to 150° C. For example, when tert-butyl chloride is reacted with the catalyst of the present invention, tert-butyl alcohol is mainly produced in the range from 50° C. to 70 °C. and isobutylene is mainly produced in the range from 70° C. to 150° C.

The industrial availability of the process for producing olefinic hydrocarbons and alcohols in accordance with the present invention is based on the following reactions.

In the case that isobutylene, which is useful in petrochemical industry, is isolated from $C_4$ hydrocarbons using, for example, hydrogen chloride, isobutylene can be recovered in good yield and with high selectivity by causing tertiary butyl chloride to decompose by means of the present catalyst. Further, in the synthesis of vinyl chloride from ethylene dichloride, the catalyst system of the present invention can be employed effectively.

Furthermore, the catalyst of the present invention is also effective in case of producing straight chain mono-olefins or alcohols containing from 10 to 15 carbon atoms from normal paraffin monochlorides.

The following example is illustrative of the present invention.

EXAMPLE I

In a glass reaction vessel of 200 ml., 50 ml. of aqueous catalyst solution was prepared, which contained 3.5 mol of antimony trichloride and 3.0 mol of hydrogen chloride per 1 litre of catalyst solution. Then, 100 millimol of tertiary butyl chloride was added into the solution and was reacted at a temperature of 50° C. with stirring. After 40 minutes of the reaction, 85 millimol of tertiary butyl alcohol and 10 millimol of isobutylene were obtained as the reaction products and a trace amount of isobutylene polymer was found as by-product.

EXAMPLE II

In the reaction as described in Example I, only reaction temperature was changed to be at 80° C. After 30 minutes reaction, 92 millinol of isobutylene was obtained and a trace amount of tertiary butyl alcohol was produced. Further, in place of the catalyst of the present invention, 100 millimol of tertiary butyl chloride was decomposed in 50 ml. of water at a temperature of 80° C., and as the result of the reaction, merely 55 millimol of isobutylene and 4 millimol of tertiary butyl alcohol were obtained after 120 minutes of reaction.

EXAMPLE III

Into a glass reaction vessel of 200 ml., 50 ml. of aqueous catalyst solution was poured which contained 2.5 mol of antimony trichloride and 2.5 moles of hydrogen chloride per 1 litre. The vessel was heated to become 100° C. and then tertiary butyl bromide was started to drop into the vessel. The reaction was continued at a temperature of 100° C. for 20 minutes until 100 millimol of isobutylene bromide was obtained and formation of tertiary butyl alcohol was not observed.

EXAMPLE IV

By means of the same procedure as disclosed in Example III, 100 millimol of isopropyl iodide was decomposed with 50 ml. of catalyst solution containing 1.8 mol of antimony trichloride, 1.7 mol of zinc chloride and 3.5 mol of hydrogen chloride per 1 litre at a temperature of 100° C. After 30 minutes of the reaction, 91 millimol of propylene was obtained and a very small amount of isopropyl alcohol was formed.

EXAMPLE V

By means of the same procedure as disclosed in Example III, 100 millimol of normal butyl chloride was decomposed with 50 ml. of catalyst solution containing 3.5 mol of antimony trichloride and 3.5 mol of hydrogen chloride per 1 litre at a temperature of 100° C. After 100 minutes of the reaction, 88 millimol of butene-1, 2 millimol of normal butyl alcohol, and 1 millimol of secondary butyl alcohol were obtained.

EXAMPLE VI

By means of the same procedure as disclosed in Example III, 100 millimol of ethylene dichloride was decomposed with 50 ml. of catalyst solution containing 3.7 mol of antimony trichloride and 2.9 mol of hydrogen chloride per 1 litre at a temperature of 100° C. After 95 minutes of the reaction, 40 millimol of vinyl chloride, and small amounts of 2-chloroethanol and ethylene glycol were obtained.

EXAMPLE VII

By means of the same procedure as disclosed in Example III, 100 millimol of 2-chlorododecane was decomposed with 50 ml. of catalyst solution containing 4.5 mol of zinc chloride and 4.5 mol of hydrogen chloride per 1 litre at a temperature of 100° C. After 100 minutes of the reaction, 37 millimol of dodecene-1, 54 millimol of dodecene-2, and 5 millimol of dodecyl alcohol were obtained.

What is claimed is:

1. A process which comprises contacting an alkyl halide with an aqueous catalyst solution containing from 2 to 6 mol/l. of hydrogen chloride and from 2 to 6 mol/l. of a metal chloride selected from the group consisting of antimony trichloride and zinc chloride at a temperature between 50° C. and 150° C. to produce an olefinic hydrocarbon having the same number of carbon atoms as said alkyl halide.

2. A process according to claim 1, wherein said alkyl halide has from 2 to 18 carbon atoms.

3. A process according to claim 1 wherein the metal chloride is zinc chloride.

4. A process which comprises contacting an alkyl halide with an aqueous catalyst solution containing from 2 to 6 mol/l. of hydrogen chloride and from 2 to 6 mol/l. of antimony trichloride at a temperature between 50° C. and 150° C. to produce an olefinic hydrocarbon having the same number of carbon atoms as said alkyl halide.

References Cited

UNITED STATES PATENTS

| | | | |
|---|---|---|---|
| 2,065,323 | 12/1936 | Thomas et al. | 260—677 H |
| 2,277,650 | 3/1942 | Mueller-Cunradi et al. | 260—677 H |
| 2,478,270 | 8/1949 | Ipstieff et al. | 260—682 |

FOREIGN PATENTS

| | | | |
|---|---|---|---|
| 248,447 | 12/1960 | Australia | 260—640 |

BERNARD HELFIN, Primary Examiner

J. E. EVANS, Assistant Examiner

U.S. Cl. X.R.

252—434; 260—633, 636, 640, 656